UNITED STATES PATENT OFFICE.

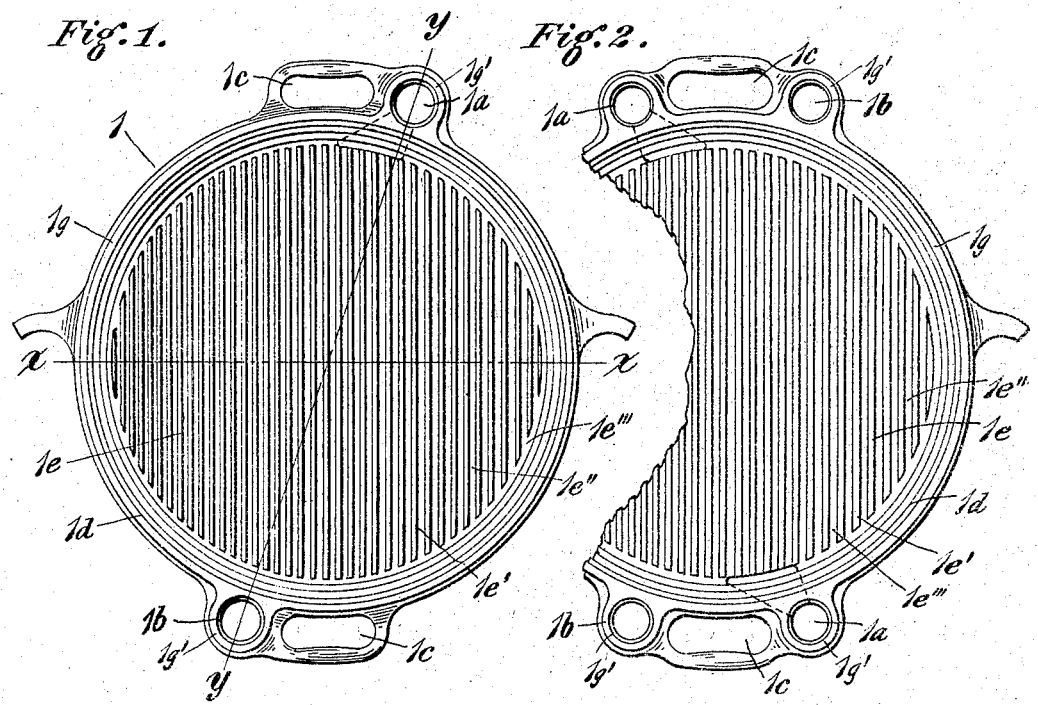
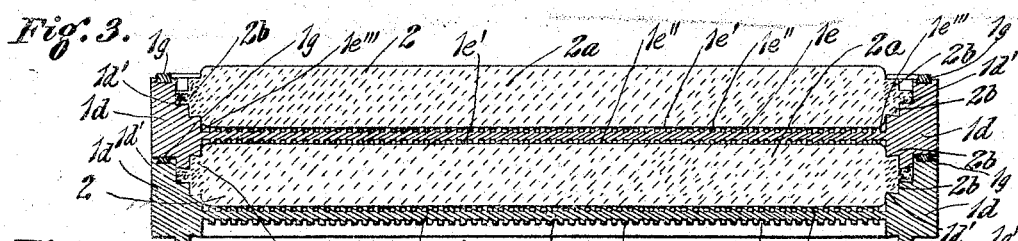
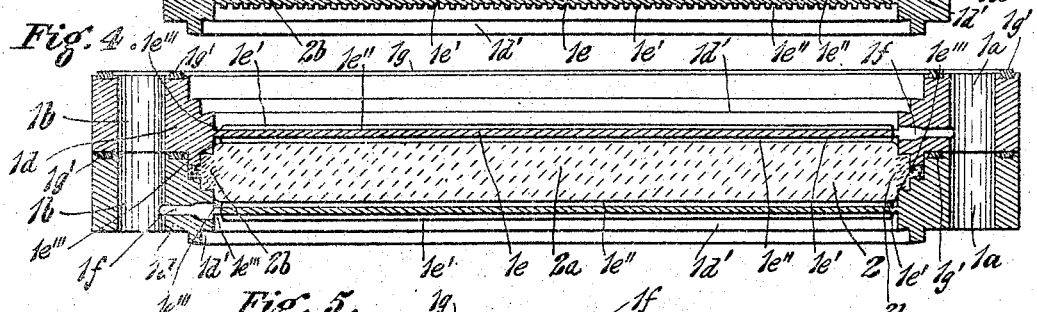
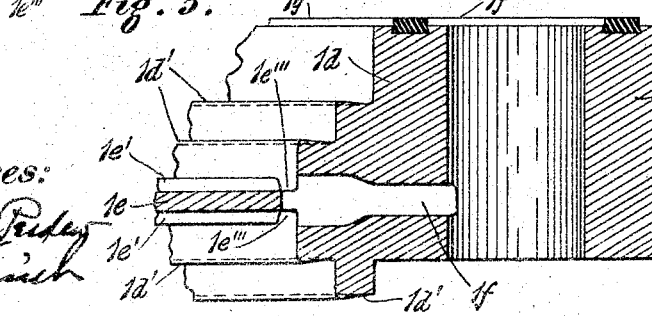

KARL KIEFER, OF CINCINNATI, OHIO.

FILTER ELEMENT.

1,002,587. Specification of Letters Patent. Patented Sept. 5, 1911.

Application filed April 14, 1911. Serial No. 621,097.

*To all whom it may concern:*

Be it known that I, KARL KIEFER, a citizen of the United States, and resident of Cincinnati, in the county of Hamilton and State of Ohio, have invented certain new and useful Improvements in Filter Elements, of which the following is a specification.

My invention relates to filters, and its object is to increase the efficiency of such apparatus, as well as to simplify the method of producing its parts, the invention consisting in the parts and in the details of construction and arrangement of parts as will hereinafter be more fully described and claimed.

In the drawing: Figure 1 is a broadside view of one of my improved filter elements, the plate only being seen. Fig. 2 is a similar view of a modification thereof, part of the plate being represented as broken away, for lack of space. Fig. 3 is a cross-section on the line $x$—$x$ of Fig. 1, representing two of the plates and one layer inclosed thereby, and another layer exposed. Fig. 4 is a conventional section approximately on the line $y$—$y$ of Fig. 1, through the inlet and outlet of the plate, the ribs of the plates, however, being represented as parallel with this line $y$—$y$, for sake of clearness. Fig. 5 is an enlarged part section corresponding to the section of Fig. 4, to better illustrate the more important details of my invention.

The filter is made up of a series of the plates 1 and the layers 2, alternating, and, as I prefer to illustrate them, the plates telescope, and the layers 2 are completely inclosed by the telescoping plates when they have been assembled. Also, the inlet and outlet extensions, $1^a$ and $1^b$, respectively, with their openings, register when the plates thus telescope, so that the series of assembled plates will constitute a continuous supply passage and a continuous outlet passage for the liquid filtered. In the plates illustrated in Figs. 1, 3, 4 and 5, there is only one outlet and one inlet passage to each plate, but in the plate illustrated in Fig. 2, each plate is designed to have diametrically opposite inlets and diametrically opposite outlets; this latter design is generally followed, although the single inlet and single outlet system will be found equally efficient under most conditions, and is simpler. In either case, whether there be one or two sets of inlet and outlet passages, the handles $1^c$ are placed diametrically opposite and in vertical alinement, and the extensions $1^a$ and $1^b$ are displaced circumferentially of the plates to allow this position of the handles; the extensions being displaced in the same direction around the plate, their diametrically opposite relation is maintained. By this arrangement, the handles and extensions are confined to the same zone of substantially circumferential alinement, improving the plate as an article of manufacture by the simple, compact make-up afforded, and imparting added strength thereto in proportion to the weight. It dispenses with the projecting, more or less unwieldy handles, generally made separate and fastened to the plates and liable to become loosened in use. By this improved construction, the entire filter plate may be integral, and its bulk and weight reduced considerably.

These filter elements are more especially related to that type employing compressed, moist, fibrous pulp as a filtering medium, and it is to the facilitation of the use of such a filtering material that the more important details of my invention are devoted. In various prior patents, I have disclosed the use of such pulp with regions adjacent an inlet or outlet more compressed than interior regions, so that the more compressed regions form gaskets, while the less compressed interior constitutes the filtering body of the apparatus. This higher degree of compression is provided by compressing the desired part of the filtermass to a lesser thickness, and in such an operation, of course, an off-set or shoulder is formed between the less compressed part and the more compressed part. Where it is desired to attain a high degree of compression of this more compressed part, and thus render it a perfectly liquid-tight gasket-forming element, the difference between the differently compressed parts of the layer may be considerable, and the off-set so formed may be excessive, in which case there is liability of disruption of the structure of the filtermass in the region of the off-set, either while the layer is being made, or while it is being handled, or even after it has been assembled in the filter and is in use, owing to the severe inequality of strains imposed on the two differently treated parts of the layer during compression.

I eliminate the above excessive difference in stresses, and avoid the difficulties incident thereto, by providing the filter layer with a terraced margin, and by providing the plate which is to receive and coöperate with said layer with its thicker outer marginal part terraced to correspond with the terraced margin of the layer. Such a filter layer may have its marginal region more compressed than its interior filtering region, for the purposes above set forth, by stages of compression, so that the difference in stress imposed on any two immediately adjacent regions of the filter mass will not be so excessive as to cause the disruption above alluded to, but to leave the structure of the layer sound and adapted to operate in the filter with its full efficiency.

The type of filter plate which I illustrate as an embodiment of my improvements above described, comprises the thicker outer marginal part $1^d$, which is terraced as set forth, and a thinner interior liquid-conducting part $1^e$, which has a series of transverse parallel ribs $1^{e'}$. These ribs $1^{e'}$ terminate short of the interior of the thicker marginal part $1^d$, so that they not only form a series of transverse channels $1^{e''}$, but also leave an annular channel $1^{e'''}$, through which the transverse channels $1^{e''}$ intercommunicate. These ribs $1^{e'}$, and the channels they form, being on both sides of the thin interior part $1^e$, it will be seen that a complete universal liquid-conducting system is provided on both sides of the plate interiorly thereof. The dimensions and cross-sectional formation of the channels $1^{e''}$ and $1^{e'''}$ are such that when a filter layer 2, of compressed moist pulp, is juxtaposed to the plate 1, and its inner less compressed part $2^a$ comes into contact with the ribs $1^{e'}$ of the interior thinner part $1^e$ of the plate, the fibers of the pulp layer will not embed in the channels between and around the ribs, but will be supported across said channels, leaving the channels open for the conduction of the liquid to and from the body of the layer.

The layer 2, with its inner less compressed part $2^a$ lying within and making close contact with the ribbed inner part $1^e$ of the plate, has its terraces $2^b$ brought into the terraces $1^{d'}$ of the thicker outer marginal part $1^d$ of the plate. As shown, there are two of these steps or terraces $2^b$ on each side of the layer 2, and a corresponding two terraces $1^{d'}$ on each side of the plate 1. In accordance with the telescoping arrangement of the plates, one side of the plate has the two terraces adjacent and receding from the interior thereof by the abrupt stages described, and finally, has an extended encompassing stage of its interior wall, substantially equal in axial extent to two stages of the terraced formation; and the other side of the plate has the two terraces thus adjacent and receding from the interior by said abrupt stages, and then terminating, with an outwardly presented or convex stage that is of extent substantially equal to one of the stages of the terraced formation and of outer diameter such as to admit it snugly into the encompassing stage of the next plate. It will be seen that with the parts so proportioned, when the plates telescope, the opposite terraced marginal parts of the layer 2 will be received into and inclosed by the telescoping terraced parts of the plate 1, and the only open spaces left between the plates and the inclosed layer will be the channels in the interior, for the proper conduction of the liquid. The terraced parts of the plate and the layer, of metal, and of extremely hard compressed pulp, respectively, will fit together so intimately that no leakage of the liquid can take place between the outer marginal parts of the filter elements.

Passages $1^f$ extend inwardly from the inlets and the outlets of the plates, in the extensions $1^a$ and $1^b$, respectively, between the terraced parts of the plate adjacent thereto, and preferably in the plane of the thin interior part of the plate. These passages $1^f$, as shown, widen somewhat, inwardly, and the thin part of the plate has a segmental slot through it at the mouth of the passage $1^f$, in each instance, of substantially the extent of the annular channel $1^{e'''}$, so that the passage may communicate with said annular intercommunicating channels $1^{e'''}$ on both sides of the plate, and, through them, to the transverse channels $1^{e''}$.

To supplement the highly compressed parts of the layers in their gasket forming function, gaskets $1^g$ may be embedded in annular grooves on the faces of the thick outer marginal parts of the plates where they come together, and, also, there may be gaskets $1^{g'}$ around the inlet and outlet openings in the extensions of said plates, also embedded therein, and these gaskets $1^g$ and $1^{g'}$ may be continuous, as shown. The gaskets $1^{g'}$ preserve the continuity of the inlet and outlet passages formed by the registering openings of the assembled plates.

The radially projected surfaces of the terraces $1^{d'}$ of the plates 1 are preferably inclined to the plane of the plate, so that said surfaces on respective sides of a plate are inclined toward each other radially outwardly of the plate, uniformly therearound, as illustrated. Thus formed, when two plates approach, they form slightly inclosing, gripping "dovetails" that "bite" into the terraces of the filter layer 2 and add to the security with which it is held between the thick parts of the plates. The layer, when it is formed, previously, and extraneously of the filter plates, by means of a packing press, preferably has its radially projected surfaces of its terraces $2^b$ substantially in the plane of the layer, as indicated at the exposed upper side of the layer in Fig. 3 of the drawing. The layer is so proportioned with respect to the plates that it receives additional compression when the plates are brought together, and it will be seen that the projection of the inclined surfaces of the terraces of the plates will indent the terraces of the layer during this additional pressure, as described. Such an arrangement admits of an especially high degree of compression and intimate contact between the outermost terrace 2$^b$ of the layer and the corresponding terrace of the plate, without incurring any of the disadvantages hereinbefore alluded to.

It will be readily understood from the foregoing that my invention is not limited in its application to the combination with the exact details described, but,

What I claim as new and desire to secure by Letters Patent is:

1. In a filter, the combination of filter plates, each having a thinner interior part, and a thicker terraced outer marginal part, and a filter layer with a terraced marginal region held between the terraced parts of the plates.

2. In a filter, the combination of filter plates, each having a thinner channeled interior part, and a thicker terraced outer marginal part, and a filter layer with a terraced marginal region held between and conforming to the terraced parts of the plates, but being supported across the channels of the interior parts of the plates.

3. In a filter, the combination of filter plates, each having a thinner interior part and a thicker terraced outer marginal part, and having their marginal parts telescoping, and a filter layer with a terraced marginal region held between and inclosed within the telescoping terraced parts of the plates.

4. In a filter, the combination of filter plates, each having a thinner interior, and a thicker terraced outer marginal part, and a filter layer with a terraced marginal region to be held between the terraced marginal parts of the plates, said terraced parts of the plates being projected so as to indent the terraced parts of the layer.

5. In a filter, the combination of filter plates, each having a thinner interior part with intercommunicating channels, and having a thicker terraced outer marginal part, and a filter layer previously formed, extraneously of the plates, with a terraced marginal region to be held between and conform to the terraced parts of the plates, and having an interior filtering region to be embraced between said thinner interior parts of the plates and supported across the channels thereof.

6. In a filter, as a liquid conductor, a plate having a thinner interior part with intercommunicating channels, and having a thicker outer marginal part comprising a terrace with a step remote from said interior part, and a step intermediate of the remote step and the interior part.

7. In a filter, as a liquid conductor, a plate having a thinner interior part with transverse intercommunicating channels, and having a thicker terraced outer marginal part with a passage through it to the intercommunicating channels.

8. In a filter, a filter plate with vertically disposed diametrically opposite handles and oppositely disposed conduit extensions, said handles and said extension being substantially in circumferential alinement.

9. In a filter, a filter layer with a multiple-terraced margin.

10. In a filter, a filter layer having multiple-terraced regions on both sides.

11. In a filter, a filter layer of compressed fibrous pulp having its marginal region more compressed than its interior region by stages of compression, whereby its marginal region is terraced, for the purposes set forth.

12. In a filter, a filter layer previously compressed extraneously of the filter, with a terraced marginal region having steps of varying degrees of compression.

13. In a filter, a filter layer previously compressed extraneously of the filter, with a terraced marginal region having inner, outer, and intermediate steps of minimum, maximum and intermediate degrees of compression, respectively.

In testimony whereof I have hereunto signed my name in the presence of two subscribing witnesses, this 10th day of April, 1911.

KARL KIEFER.

Witnesses:
CLARENCE PERDEW,
E. E. FINCH.